United States Patent [19]

Danek

[11] Patent Number: 5,584,498
[45] Date of Patent: Dec. 17, 1996

[54] SUSPENSION SYSTEM FOR VEHICLE

[75] Inventor: Magnus Danek, Upplands Vasby, Sweden

[73] Assignee: Yamaha Hatsudoki Kabushiki Kaisha, Iwata, Japan

[21] Appl. No.: 424,591

[22] Filed: Apr. 17, 1995

Related U.S. Application Data

[63] Continuation of Ser. No. 137,910, Oct. 15, 1993, abandoned.

[30] Foreign Application Priority Data

Oct. 15, 1992 [SE] Sweden .................................. 9203031

[51] Int. Cl.$^6$ ..................................... B60G 11/26
[52] U.S. Cl. ......................... 280/714; 280/703; 280/708
[58] Field of Search ..................... 280/702, 707, 280/708, 709, 714, 6.12, 703, 689

[56] References Cited

U.S. PATENT DOCUMENTS

| | | | |
|---|---|---|---|
| 2,978,254 | 4/1961 | Bundorf | 280/6.12 |
| 2,985,444 | 5/1961 | Cadiou et al. | |
| 3,778,081 | 12/1973 | Takahashi et al. | 280/6.12 |
| 3,895,816 | 7/1975 | Takahashi et al. | 280/6.12 |
| 3,945,664 | 3/1976 | Hiruma | 280/708 |
| 4,270,771 | 6/1981 | Fujii | 280/707 |
| 4,295,660 | 10/1981 | Toti et al. | 280/714 |
| 4,478,431 | 10/1984 | Muller et al. | 280/714 |
| 4,497,505 | 2/1985 | Harrison et al. | 280/714 |
| 4,573,705 | 3/1986 | Kanai et al. | 280/708 |
| 4,655,440 | 4/1987 | Eckert | 280/714 |
| 4,702,490 | 10/1987 | Yamaguchi et al. | 280/707 |
| 4,779,895 | 10/1988 | Rubel | 280/714 |
| 4,787,650 | 11/1988 | Doi et al. | 280/708 |
| 5,107,969 | 4/1992 | Klein et al. | 280/707 |
| 5,193,845 | 3/1993 | Yokote et al. | 280/707 |
| 5,338,010 | 8/1994 | Haupt | 280/714 |

FOREIGN PATENT DOCUMENTS

| | | | |
|---|---|---|---|
| 079189 | 5/1983 | European Pat. Off. . | |
| 201425 | 12/1986 | European Pat. Off. . | |
| 1483928 | 6/1967 | France | 280/708 |
| 2057130 | 4/1971 | France . | |
| 2503641 | 10/1982 | France . | |
| 2677306 | 6/1991 | France . | |
| 4011327 | 10/1991 | Germany . | |
| 0023714 | 2/1984 | Japan | 280/6.12 |
| 59-124422 | 7/1984 | Japan . | |
| 0113709 | 6/1985 | Japan | 280/709 |
| 1378787 | 12/1974 | United Kingdom . | |
| 9200203 | 6/1991 | WIPO . | |

OTHER PUBLICATIONS

Patent Abstracts of Japan, vol. 15, No. 441, (M–1177), Nov. 11, 1991, JP-A-03 186 413 (Nissan Motor Co Ltd), Aug. 14, 1991.

European Search Report.

*Primary Examiner*—Paul N. Dickson
*Attorney, Agent, or Firm*—Knobbe, Martens Olson & Bear

[57] ABSTRACT

Several embodiments of suspension systems for vehicle wheels arranged in pairs and having paired shock absorbers. The shock absorbers are interrelated in such a way that they provide a first degree of damping during certain kinds of suspension loadings and a second, different rate of damping in response to inertial conditions on the vehicle. Various control systems are disclosed.

14 Claims, 3 Drawing Sheets

SUSPENSION SYSTEM FOR VEHICLE

This application is a continuation of application Ser. No. 08/137,910, filed Oct. 15, 1993 now abandoned.

BACKGROUND OF THE INVENTION

This invention relates to a suspension system for a vehicle and more particularly to an improved vehicle suspension system for interrelating the operation of the suspension elements for two of the wheels of the vehicle.

It is well known to employ a suspension system for suspending each wheel of the vehicle for suspension movement relative to the vehicle body. Conventionally, the suspension system for each wheel includes a shock absorber which is intended to control the damping functions of the movement of the wheel relative to the vehicle. However, the damping system for the vehicle wheel must damp a number of different types of motions.

For example, when the wheel travels along the road as the vehicle moves and an obstacle in the road is encountered, the suspension system permits the wheel to move relative to the body so as to dampen the shock of the road encounter. These forces are, for the most part, transmitted in a vertical direction and are due to the magnitude of the obstruction in the road. However, there are also inertial forces on the vehicle body that tend to cause the body to move relative to the wheel. For example, when rounding a corner, there will be a swaying motion from one side to the other about a longitudinal axis. In addition, when braking or accelerating or under other conditions, there will be a pitching about a transversely extending axis. If these additional motions are also damped by the suspension system, the degree of damping is basically the same regardless of the way in which the load is encountered. That is, the damping force for damping the condition when a road obstacle is encountered is the same as the damping force which is generated when there are swaying or pitching motions. Of course, it is desirable to provide a suspension system wherein the actual type of damping encountered will depend upon the way on which the load that tends to cause relatively movement between the wheel and the vehicle body is encountered. Said another way, it is generally desirable to provide a suspension system for a vehicle wherein the damping will be dependent upon the type of load encountered and the reason why the load is generated.

It is also a well known fact that the loads applied to the wheels and vehicle body are not completely isolated from each other. That is, road obstacles are encountered when rounding curves, accelerating or decelerating. Hence, it is not possible to isolate the particular type of load encountered so as to provide the optimum degree of damping dependent upon the load source.

It is, therefore, a principle object to this invention to provide an improved suspension system for a vehicle wherein the suspension system can respond to different types of loads which are encountered as the same time and provide the proper damping for each load.

As a specific example, when rounding a corner, it is generally to avoid too much leaning of the body relative to the wheels. It has been proposed, therefore, to provide a stiffening action to the rolling motion under these circumstances. However, this solution to the problem is not necessarily the optimum.

For example, if the dynamic sway stiffness is too great, then there is an increased total load on the outer wheels which can present problems. This is particularly true with respect to the front wheel when entering a corner and the rear wheel when accelerating under leaving a bend.

It is, therefore, a still further object to this invention to provide an improved arrangement for interrelating the operation of the suspension system so as to provide appropriate damping under all conditions and to reduce loads on the wheels caused by inertial forces.

In addition to the foregoing criteria, it is also desirable to insure that the shock absorber mechanism itself is relatively simple and can be easily adjusted. That is, although various complicated systems have been provided for shock absorber control, the more complicated the system the more difficult it is to manufacture and adjust properly. In addition, the control for varying conditions can become complex.

In accordance with another feature of the invention, therefore, it is a further object to this invention to provide an improved and simplified shock absorber control system for a vehicle.

SUMMARY OF THE INVENTION

A first feature of the invention is adapted to be embodied in a vehicle having a body and at least a pair of wheels. First and second suspension units suspend respective of the wheels from the body for relative movement therebetween. Control means control the damping of the suspension units to a first value in response to the suspension movement caused by a respective wheel encountering a road obstacle and a second value in response to suspension movement caused by inertial effects on the vehicle body.

Another feature of the invention is also adapted to be embodied in a vehicle having a body and a pair of wheels that are supported for movement relative to the body by first and second suspension units. Each of the suspension units comprises a piston and cylinder that define a fluid chamber and a damping valve for damping the fluid flow from the chamber in response to movement of the piston relative to the cylinder. A passage interconnects the chambers of the suspension elements and valve means are provided for controlling the flow through the passage in response to a vehicle condition.

DETAILED DESCRIPTION OF THE PREFERRED EMBODIMENTS OF THE INVENTION

Figure 1:
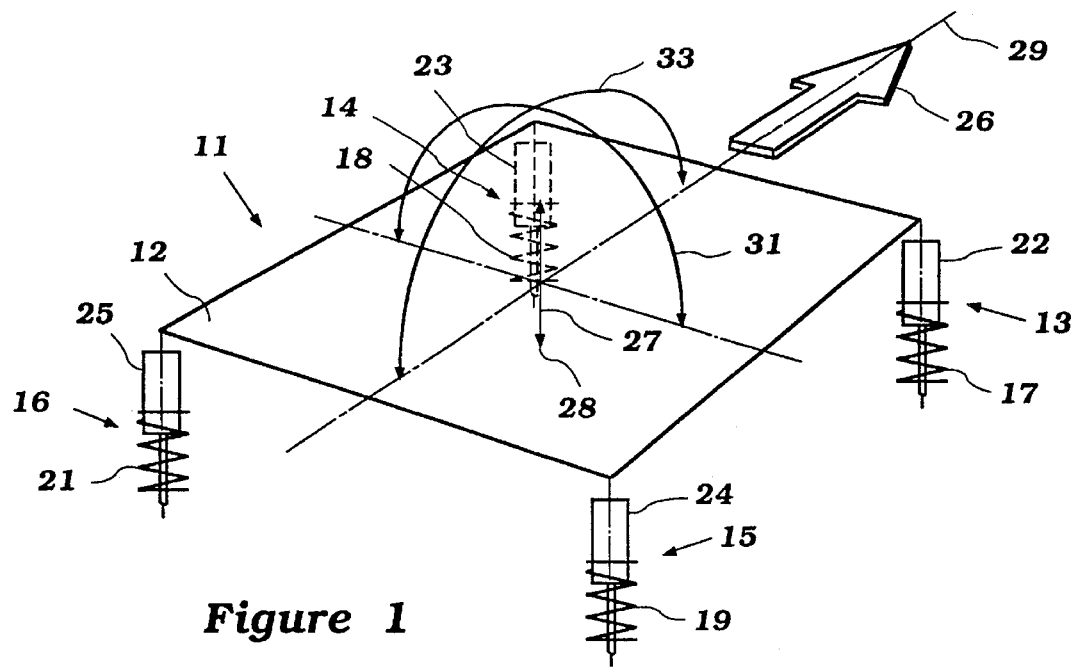
FIG. 1 is a partially diagrammatic view showing schematically the suspension system for a vehicle and the various types of motions and loads which may be encountered.

Referring now in detail to the drawings and initially to FIG. 1, this figure will be employed to describe the various types of suspension movement which are encountered when a vehicle, indicated generally by the reference numeral 11 travels. The vehicle 11 is depicted as having a body, indicated generally at 12 with four wheels (not shown in this figure) supported for suspension movement relative to the body 12 by respective pairs of front suspension units, indicated generally by the reference numerals 13 and 14, respectively, and rear suspension units, indicated generally by the reference numerals 15 and 16.

In the described suspension system, the suspension units 13, 14, 15 and 16 support their respective wheels for movement independently of each other relative to the body 12 although there is some interrelationship through the suspension system and control as will be described. The actual structure by which the wheel is suspended relative to the body 12 is not critical to the invention and the invention is not necessarily limited to independent wheel suspension systems. However, each of the suspension units 13, 14, 15 and 16 includes a respective spring 17, 18, 19 and 21 and associated shock absorber 22, 23, 24 and 25, respectively. In the illustrated embodiment, the springs 17, 18, 19 and 21 are depicted as being of the coil type and the shock absorbers 22, 23, 24 and. 25 are depicted as being of the piston and cylinder type. It will be readily apparent to those skilled in the art that the invention can be employed in conjunction with various types of spring elements and various types of shock absorbers.

When the vehicle 11 travels along the road in a forward direction, generally indicated by the arrow 26, there will be various movements of the body 12 relative to the wheels as permitted by the suspension systems 13, 14, 15 and 16 in response to various types of loadings. For example, when each wheel strikes an obstacle in the road, there will be a generally vertically extending force applied in a generally vertical direction as indicated by the line 27 and these forces are exerted in generally vertical directions as indicated by the force vector 28 with the upward movement being jounce and the downward movement be considered as rebound. The vehicle 11 also will experience rolling or leaning motions about a longitudinal center axis 29 in response to forces such as cornering and these leaning or rolling forces are indicated by the vector 31. Furthermore, there will be fore and aft pitching forces about a transversely extending axis 32 that is positioned perpendicular to the axis 29 and these forces are indicated by the vector 33. These pitching forces are generated primarily either by braking or accelerations.

The invention deals primarily with a control system for the suspension units and particularly the shock absorbers 22, 23, 24 and 25 wherein their shock absorbing characteristics will be varied depending upon the source of the force and this variation accommodates situations where forces of more than one nature may be experienced at a given time.

Figure 2:
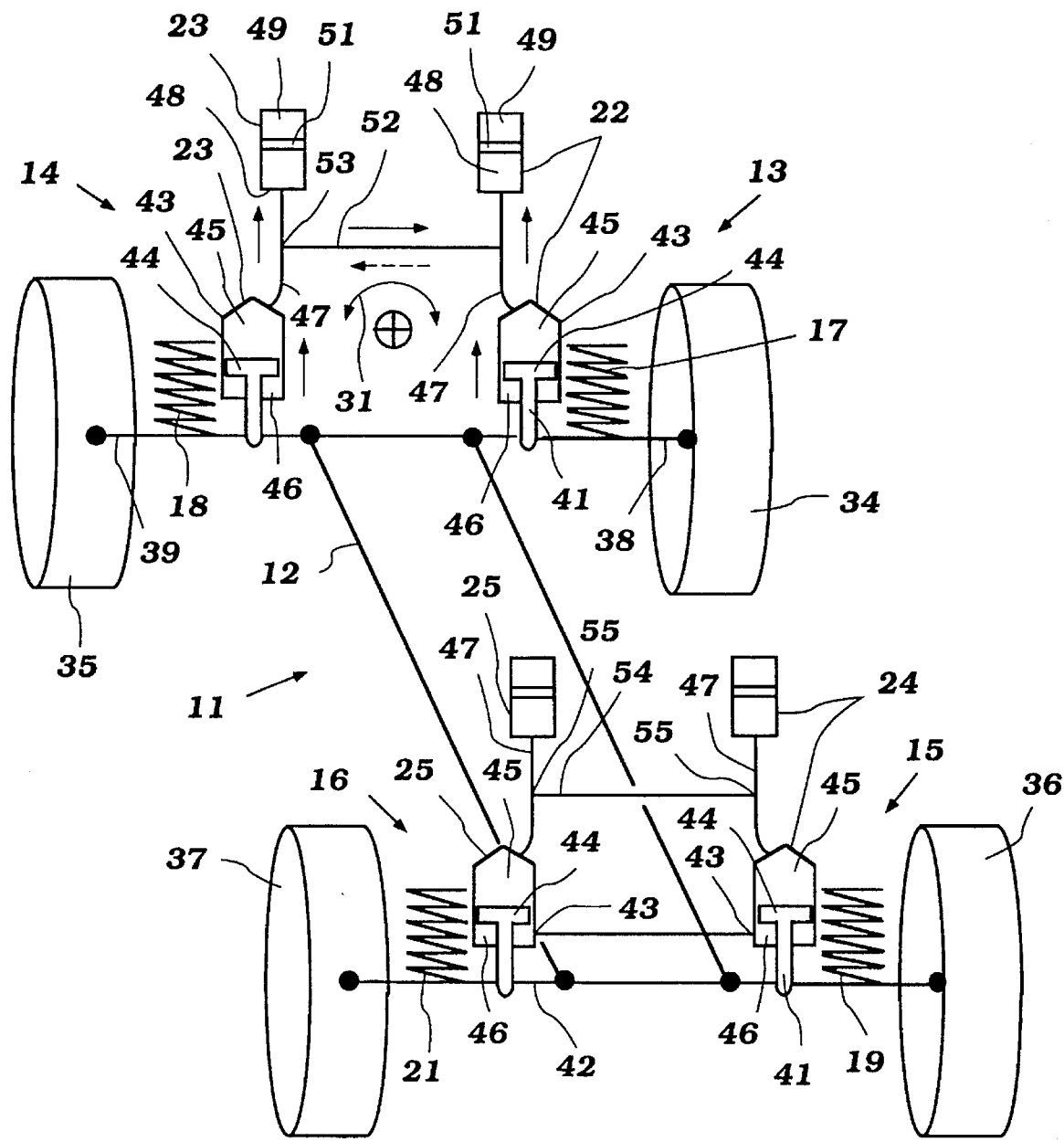
FIG. 2 is a partially schematic perspective view showing a suspension system constructed in accordance with an embodiment of the invention.

The system will now be described in more detail by reference to FIGS. 2 and 3 wherein a more detailed description of the various components is possible. FIG. 2 shows more details of the actual wheel suspension systems and the front wheels are depicted by the reference numerals 34 and 35, respectively, while the rear wheels are indicated by the reference numerals 36 and 37. Each of the wheels 34, 35, 36 and 37 is mounted on a respective axle 38, 39, 41 and 42 in any suitable manner, with these axles being supported by known types of suspension system from the body 12. It should be noted, by the way, that the term "body" refers to the main portion of the vehicle 11 and may refer either to a separate frame, a unitized body and frame assembly or the like. The actual type of suspension system employed, except for the shock absorbers, may be of any known type.

Figure 3:
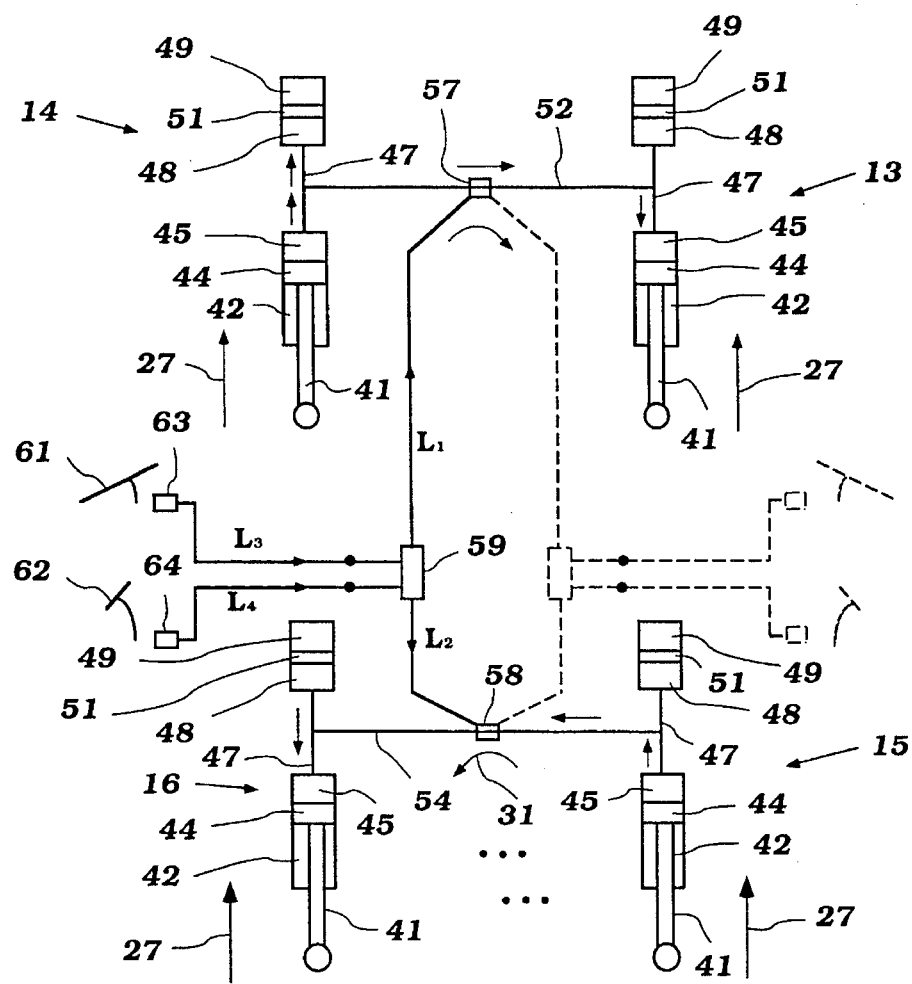
FIG. 3 is a diagrammatic view showing the suspension system and the controls for it.

The construction of the individual shock absorbers 22, 23, 24 and 25 is shown in more detail in FIGS. 2 and 3 and each shock absorber may be of the Öhlins racing type and includes a cylinder 43 that is affixed in any known manner to the vehicle body 12 and which defines an inner chamber in which a piston, indicated by the reference numeral 44 is slidably supported. The piston 44 and cylinder 43 define a first fluid chamber 45 that is filled with an appropriate hydraulic fluid. There is further provided a lower chamber 46 beneath the pistons 44 and through which a piston rod extends which piston rod is connected in a known manner for movement with the respective axle 38, 39, 41 and 42 upon suspension travel.

As depicted schematically, the fluid which is displaced from the chamber 43 when the piston 44 moves upwardly is displaced through a conduit 47 in which a shock absorber valve (not shown) is positioned into a further chamber 48 that contains hydraulic fluid and a pressurized gas 49 above a floating piston 51. Hence, the damping to vertical motion will be controlled by the size of the restricted orifice 47 or absorber valve and the pressure in the chambers 49. A like system may be provided for displacement of the fluid from the lower chambers 46 and, in some types of shock absorbers, the flow from the chamber 45 may be in part to the chamber 46 and vice versa. As has been previously noted, the particular type of shock absorber employed is not a particular part of the invention and as will become apparent to those skilled in the art, the invention may be employed in conjunction with a wide variety of types of shock absorbers.

In connection with the invention, an arrangement is provided for connecting the shock absorbers of the respective pairs 13, 14 and 15, 16 so that their chambers 45 may communicate with each other without the influence of the shock absorbing valves in the conduits 47. For this purpose, there is provided an interconnecting conduit 52 in the conduits 47 between the damping valves that control the flow from the chambers 45 into the chambers 48 at the points 53. As will become apparent, a valve which can be separately controlled may be provided in the conduit 52 so as to control the affect of the side to side communication.

In the figures, a corresponding connecting conduit 54 is provided between the chambers 45 of the rear shock absorbers 15 and 16 and this communicates at the point 57 with the conduits 47 which is again between the chambers 45 and the damping shock absorbing valves. As a result of the interconnecting conduits 52 and 54, the damping action of the individual shock absorbers 13, 14 and 15, 16 is somewhat reduced when cornering and leaning loads are encountered. For example, when turning in the right hand direction the body 12 will tend to sway to the left as shown by the arrow 31 and this will place compression on the fluid in the chamber 45 of the shock absorber 14. Rather than having to flow through the shock absorbing valve where high flow resistance will be encountered, this fluid displaced from the chamber 45 of the shock absorber 14 may flow through the conduit 52 to enter the chamber 45 of the shock absorber 13 so as to form an expansion force thereon. Therefore, even though relatively stiff damping may be provided for vertical loads or to resist pitching loads, there will be a softer control on leaning and reduce the load the offhand wheel 35 and may steering easier and also improve cornering.

A similar affect can be had through the connection 54 between the shock absorbers of the rears wheels 36 and 37 to provide some greater softness when accelerating and exiting a curve. Thus, the shock absorbing action can be varied depending upon the type of load encountered and the proper amount of damping can be provided for each type of load.

As has been previously noted, valves may be provided in the interconnecting conduits 52 and 54 and such valves are shown in FIG. 3 wherein the valves are indicated by the respective numbers 57 and 58. A wide variety of types of controls can be provided for these valves 57 and 58 and the valves may either be simple on/off valves or may be proportional valves, depending upon the desired result. The valves 57 and 58 may be conveniently electrically operated and are controlled by a control box, indicated schematically as 59, by respective control signals $L_1$ or $L_2$. Various imputs may be delivered to the control box 59 such as a control from an accelerator pedal 61 or a brake pedal 62 by respective sensors 63 and 64. The sensors 63 and 64 output signals $L_3$ and $L_4$ which are indicative of the magnitude of the opening of the accelerator 61 or the pressure on the brake pedal 62 so as to vary the control of the valves 57 and 58 in a linear function or in accordance with any other relationship.

Those skilled in the art can readily determine how best to provide the controls and either one or both of the valves 57 and 58 can be eliminated and replaced by an open passage. The interconnections 52 and 54 can be formed by relatively simple hydraulic devices such as plain hoses or the like and thus, the costs can be substantially reduced. For example, one of the valves 57 can be controlled only by the accelerator pedal 61 or the brake pedal 62 or both controls can be applied. In addition, other vehicle inputs such as a connection to the steering wheel may be employed for controlling the valve or valves 57 and/or 58.

In the embodiments as thus far described, the interconnection between the upper chambers 45 of the shock absorber pairs 13, 14 and 15, 16 have been described. It is to be understood that similar connections can be provided between the under chambers 42 and these under chambers can be provided with shock absorbing control valves, as is well known.

Figure 4:
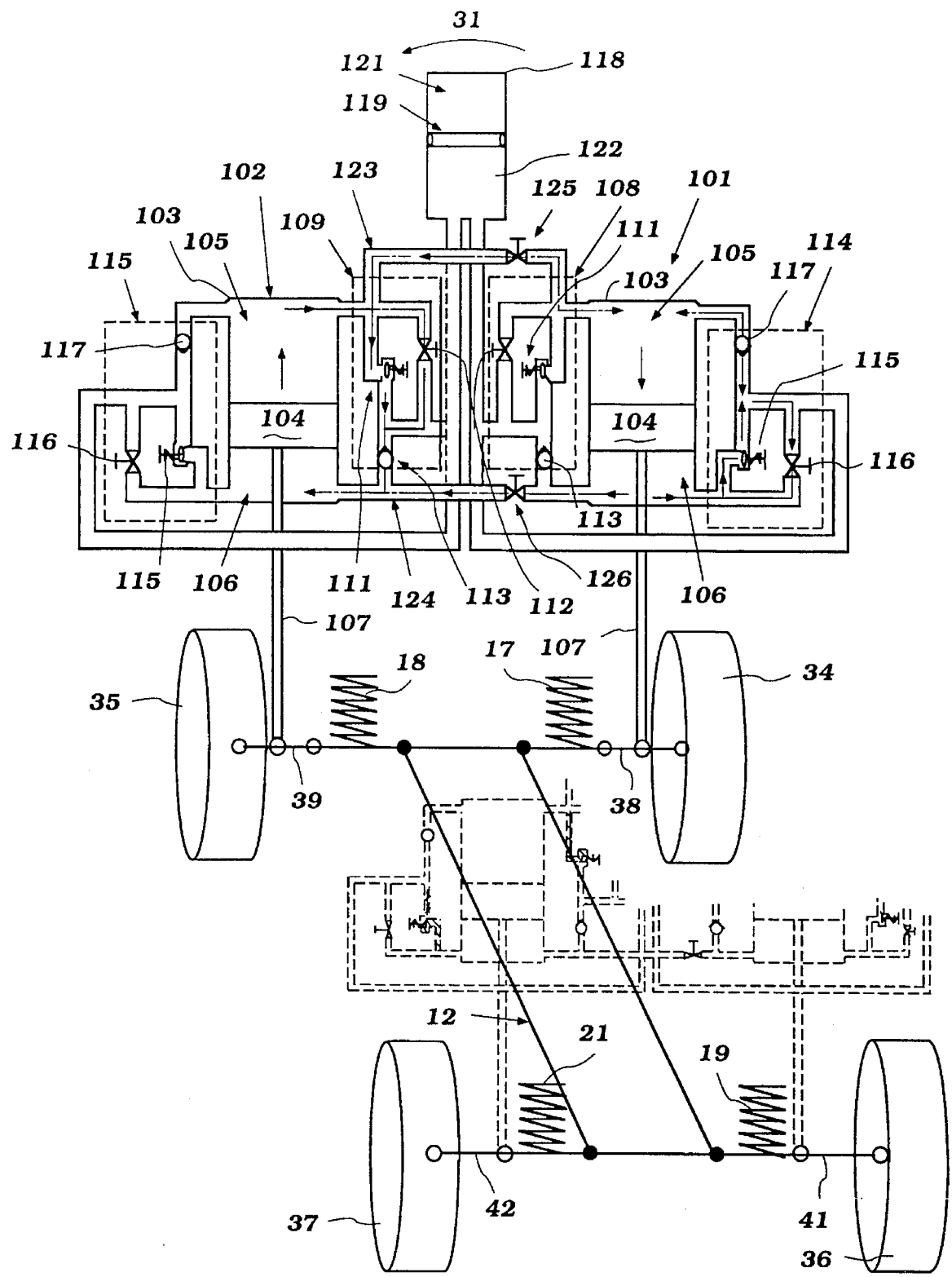
FIG. 4 is a view, in part similar to FIGS. 2 and 3, and shows another embodiment of suspension system.

In the embodiments as thus far described, the details of the individual shock absorbers 13 and specifically their controlling valves have not be illustrated or described and, as has been noted, any conventional types of constructions can be employed. The only external control has been in the interconnecting communication passageway between the pairs of shock absorbers, but FIG. 4 shows another embodiment of the invention incorporating more detail and permitting a greater latitude of controls for the various shock absorbing functions. In this figure, reference numerals applied to the units are the same as those previously employed where the construction is the same or substantially the same as the previously described embodiment. Also, in this embodiment, the shock absorbing system associated with the front wheels 13 and 14 is illustrated in detail and will be described. A similar arrangement, shown in phantom, may be employed for the rear wheels 36 and 37.

Referring now to this figure, a pair of front shock absorber are identified generally by the reference numerals 101 and 102 and are each comprised of cylinders 103 in which pistons 104 are slidably supported and define upper chambers 105 and lower chambers 106. The pistons 104 have connected to them piston rods 107 that are connected to the axles 38 and 39, respectively, so that the shock absorbers 101 and 102 act in conjunction with the front springs 17 and 18 so as to control the movement of the wheels 34 and 35 relative to the body 12.

The shock absorbers 101 and 102 are each associated with respective compression valve assemblies 108 and 109 that include respective pressure responsive control valves 111 and throttle valves or bleeders 112, which in connection with respective check valves 113 will permit flow from the upper chamber 105 to the lower chamber 106 through the conduits shown when there is an upward force on the piston 104 tending to compress the fluid in the chamber 105 and effecting its transfer to the lower chamber 106.

In a similar manner, return valve assemblies, indicated generally by the reference numeral 114 and 115, control the flow from the lower chambers 106 to the upper chambers 105 and these also include a pressure responsive control valve 115, a throttle valve 116 and one-way check valves 117 so as to permit the flow from the lower chambers 106 to the upper chambers 105 if the respective wheels 34 or 35 meet a road obstruction that causes the wheel to move downwardly relative to the body 12.

Make-up fluid to compensate for the piston rods 107 in the chambers 106 is provided by a common accumulator chamber 118 in which a floating piston 119 is provided so as to define a upper chamber 121 in which a pressurized gas is contained and a lower chamber 122 in which fluid is provided that communicates with the respective valve sections 108, 109 and 114, 115.

The throttle valves 116 may be manually set while the control valves 115 may be controlled automatically by any desired system so as to adjust or tailor the effect of the individual shock absorbers 101 and 102 as is well known in this art.

In addition to the shock absorber construction as thus far described, there are provided a pair of interconnecting passageways 123 and 124 that interconnect the upper and lower chambers 105 and 106 of the shock absorbers 101 and 102, respectively. Control valves 125 and 126 are provided in these passages and may be controlled by various vehicle parameters, such as the accelerator and brake and/or steering as previously described. The amount of opening of the control valves 125 and 126 will effect the amount of reduction in stiffness of the shock absorbers during tilting or leaning loads relative to their pitching or vertical movement control.

One particular arrangement wherein the vehicle is rounding a curve to the right and tends to lean or sway to the left as shown by the arrow 31 will be described and it is believed that this description will permit those skilled in the art to understand how this embodiment operates. If there is a sway to the left, the piston 104 of the shock absorber 102 will tend to move upwardly and compress fluid in the upper chamber 105. During normal shock absorbing functions, this fluid will be displaced through the control valve 109 to the lower chamber 106. If, however, reduction in sway resistance is desired, the valve 125 can be partially or fully opened and there will be flow as shown by the arrows from the chamber 105 of the shock absorber 102 to the chamber 105 of the shock absorber 101 so as to reduce the stiffness to leaning for sway. Hence, the control valves 108 and 109 are effectively bypassed either partially or completely. In addition, fluid may be permitted to flow from the lower chamber 106 of the shock absorber 101 to the lower chamber 106 of the shock absorber 102 through the passage 124 by the opening of the control valve 126. The amount of opening and controlling will determine the sway resistance and when the valves 125 and 126 are fully opened, minimum sway resistance will result.

It should be readily apparent that the described embodiments are very effective in permitting the shock absorber associated with each wheel to be controlled so as to provide the desired respective damping under load impact situations, pitching and/or swaying depending upon the desired operation. However, in the embodiments described, the swaying stiffness is reduced relative to the pitching and normal load stiffness so as relieve the outside wheel from loads when turning into or accelerating out of a corner. Of course various control functions may be employed different from those described without departing from the spirit and scope of the invention, as defined by the appended claims.

I claim:

1. A vehicle having a body; at least a pair of wheels; first and second hydraulic shock absorbers, each associated with a respective one of said wheels for suspending said wheels from said body for relative movement therebetween; each of said shock absorbers comprising a first chamber adapted to be pressurized upon movement of the wheel relative to the body, a shock absorbing passage continuously communicating said first chamber to a second chamber and a shock absorber valve arrangement in said shock absorbing passage for damping the suspension movement of the respective wheels by continuously controlling the flow between said first chamber and said second chamber; each of said shock absorbers thereby being effective to damp the movement of the respective wheel relative to the body independently of the other shock absorber; conduit means interconnecting said first chambers of the respective shock absorbers at a point between said first chambers and each shock absorbing valve arrangement; and control valve means in said conduit means for controlling the flow therethrough without obstructing the flow through the respective shock absorbing passages in response to a vehicle condition other than hydraulic pressure and for controlling the flow between said first chambers independent of said shock absorber valve arrangement for selectively providing damping interaction between said first chambers of said shock absorbers.

2. A vehicle as set forth in claim 1, wherein each shock absorber valve arrangement controls the hydraulic damping of the respective hydraulic shock absorber to a first value of fluid damping determined by the hydraulic pressure in the respective shock absorber in response to the suspension movement caused by the respective wheel encountering a road obstacle and the control valve means provides a second value of fluid damping determined by a vehicle condition in response to suspension movement caused by the inertial effects upon said vehicle body.

3. A vehicle as set forth in claim 2 wherein the second value is lower than the first value so that the shock absorbers provide a stiffer suspension in response to encountering a road obstacle than in response to inertial effects.

4. A vehicle as set forth in claim 3 wherein the vehicle condition comprises acceleration.

5. A vehicle as set forth in claim 3 wherein the vehicle condition comprises braking of the vehicle.

6. A vehicle as set forth in claim 5 wherein the vehicle condition further includes acceleration of the vehicle.

7. A vehicle as set forth in claim 1, wherein the shock absorber valve arrangement comprises a first valve having an orifice for controlling the flow from the first chamber to said second chamber and a pressure responsive valve in parallel relationship to said first valve for controlling the flow between said first chamber and said second chamber.

8. A vehicle as set forth in claim 7 wherein the vehicle condition comprises acceleration.

9. A vehicle as set forth in claim 7 wherein the vehicle condition comprises braking of the vehicle.

10. A vehicle as set forth in claim 9 wherein the vehicle condition further includes acceleration of the vehicle.

11. A vehicle as set forth in claim 1 wherein the conduit means comprises a hydraulic line interconnecting the shock absorbers for fluid flow therebetween.

12. A vehicle as set forth in claim 11 wherein the vehicle condition comprises acceleration.

13. A vehicle as set forth in claim 11 wherein the vehicle condition comprises braking of the vehicle.

14. A vehicle as set forth in claim 11 wherein the vehicle condition further includes acceleration of the vehicle.

* * * * *